C. W. GLOVER.
Mowing Machine.
No. 15,882.  Patented Oct. 14, 1856.
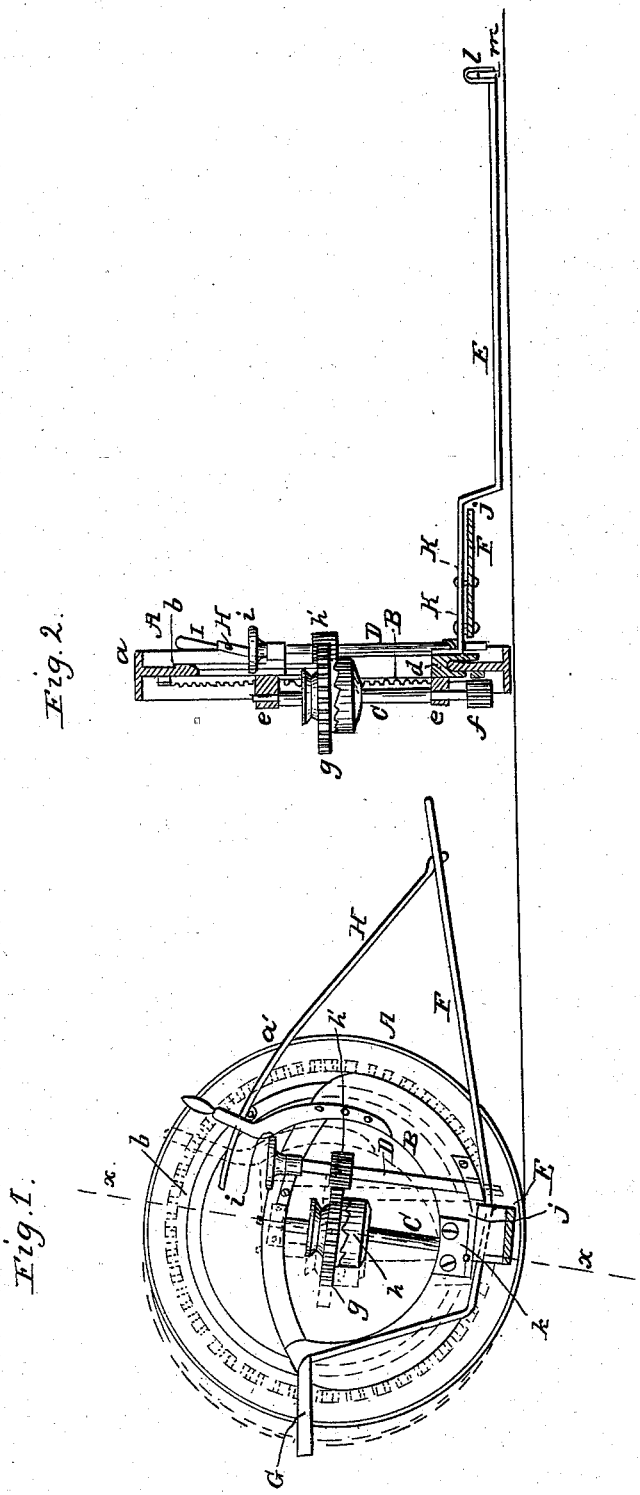

UNITED STATES PATENT OFFICE.

CARLOS W. GLOVER, OF ROXBURY, CONNECTICUT.

IMPROVEMENT IN HARVESTERS.

Specification forming part of Letters Patent No. 15,882, dated October 14, 1856.

*To all whom it may concern:*

Be it known that I, CARLOS W. GLOVER, of Roxbury, in the county of Litchfield and State of Connecticut, have invented a new and Improved Grain and Grass Harvester; and I do hereby declare that the following is a full, clear, and exact description of the same, reference being had to the annexed drawings, making a part of this specification, in which—

Figure 1 is a side view of my improvement. Fig. 2 is a vertical section of the same, *x x*, Fig. 1, showing the plane of section.

Similar letters of reference indicate corresponding parts in the two figures.

My invention consists in the peculiar construction of the machine, whereby it is simplified in a great measure, made to work with a light draft, and all the parts which require to be adjusted within reach of the driver's seat.

To enable those skilled in the art to fully understand and construct my invention, I will proceed to describe it.

A represents the driving-wheel of the machine. This wheel may be of any proper size, and is formed of a broad tread, *a*, having a flange, *b*, on its inner side at about its center. The outer side of the flange *b*, a short distance from its edge, has cogs *c* formed on it.

B represents what may be termed a "guide-box," which is a grooved segment fitted over the edge of the flange *b*. This segment extends around about three-fifths the circumference of the edge of the flange. The groove is of V shape, as shown at D, Fig. 2, and the edge of the flange *b* is of corresponding form, so that the guide-box will not have unnecessary play or work loose in consequence of wear. The flange, however, fits sufficiently loose in the groove *d* of the guide-box so that the wheel B may turn while the guide-box remains stationary.

C represents a shaft which works in bearings *e* on the outer side of the guide-box B. The lower end of this shaft has a pinion, *f*, upon it, which pinion gears into the cogs *c* on the flange *b*. The shaft C has also a toothed wheel, *g*, placed loosely upon it, said wheel being allowed to turn with the shaft C in one direction, in consequence of a clutch, *h*, which is placed on said shaft. When the shaft turns in the opposite direction the wheel *g* remains stationary, so that the sickle will not be operated when the machine is backed.

D represents a shaft which works in bearings on the inner side of the guide-box B. This shaft has a pinion, *h'*, upon it, which pinion gears into the toothed wheel *g*. The upper end of the shaft D has a hand-wheel, *i*, upon it.

E represents the finger-bar, the inner end of which is attached to the lower part of the guide-box B. The inner end of the finger-bar has a curve, *j*, in it, so that the inner part may be somewhat higher than the other portion to which the sickle is attached. (See Fig. 2.)

F represents a bar which is hinged or connected by joints *k* to the higher portion of the finger-bar E, near the driving-wheel. This bar F is attached at right angles to the finger-bar E, and the driver's seat G is attached to the back end of the bar F and the draft bar or pole to its front end.

H represents a rod, one end of which is attached to the outer end of the bar F, and the opposite end passes through a handle, I, which is attached to the guide-box B. This rod may be secured in the handle I at any desired point by means of pins or in any other proper manner, and it will be seen that by turning the guide-box B by grasping the handle I the cutting-edges of the sickle, which is attached to the finger-bar F, may be raised or lowered, so that they may cut the desired height from the ground, the rod H keeping the sickle and finger-bar in the desired position. The outer end of the finger-bar F has an arm, *l*, attached to it at right angles, a small wheel or roller, *m*, being attached to the outer end of said arm and behind the finger-bar.

The advantages of the within-described machine are that the usual main frame is dispensed with and the whole machine greatly simplified. The sickle is driven from the shaft D, and the driving device, being close to the wheel A, is kept free from cut grass or grain, and the machine works with but little friction, a light draft only being required to draw it along while performing its work. The cutters may be raised or lowered by the driver on his seat while the machine is moving along, and in case the sickle becomes clogged or choked the driver can, by turning the hand-wheel *i*, free the sickle, the machine being stopped. The guide-box B is allowed some vertical play on the flange *b*, so that the sickle may rise and fall to conform to the inequalities of the ground.

Having thus described my invention, what I claim as new, and desire to secure by Letters Patent, is—

Attaching the finger-bar E to the guide-box B, which is fitted over the flange $b$ of the driving-wheel A, as shown, the guide-box having the two shafts C D attached to it, by which motion is communicated to the sickle from the driving-wheel, and the bar F, attached to the finger-bar by hinges or joints $k$, and the guide-box B to the rod H, the whole being arranged as shown, for the purpose set forth.

CARLOS W. GLOVER.

Witnesses:
WILLIAM O. GLOVER,
ALBERT L. HODGE.